US008761944B2

(12) United States Patent
Drew et al.

(10) Patent No.: US 8,761,944 B2
(45) Date of Patent: Jun. 24, 2014

(54) APPARATUS AND METHOD FOR DETERMINING LOAD OF ENERGY CONSUMING APPLIANCES WITHIN A PREMISES

(75) Inventors: David Scott Drew, St. Louis, MO (US); Xingwen Luo, Xi'an (CN)

(73) Assignee: Emerson Electric Co., St. Louis, MO (US)

( * ) Notice: Subject to any disclaimer, the term of this patent is extended or adjusted under 35 U.S.C. 154(b) by 316 days.

(21) Appl. No.: 13/005,306

(22) Filed: Jan. 12, 2011

(65) Prior Publication Data
US 2011/0106316 A1    May 5, 2011

(51) Int. Cl.
*G05B 13/00*    (2006.01)

(52) U.S. Cl.
USPC .............................. 700/276; 705/412; 307/35

(58) Field of Classification Search
USPC .............................. 700/276; 705/412; 307/35
See application file for complete search history.

(56) References Cited

U.S. PATENT DOCUMENTS

| | | | |
|---|---|---|---|
| 7,289,887 B2 | 10/2007 | Rodgers | 700/295 |
| 7,392,115 B2 | 6/2008 | Schindler | 700/291 |
| 7,392,661 B2 | 7/2008 | Alles | 62/127 |
| 7,705,484 B2 | 4/2010 | Horst | 307/35 |
| 7,715,951 B2 | 5/2010 | Forbes, Jr. et al. | 700/291 |
| 7,845,576 B2 | 12/2010 | Siddaramanna et al. | |
| 7,908,117 B2 | 3/2011 | Steinberg et al. | 702/182 |
| 8,155,900 B1 | 4/2012 | Adams | |
| 2002/0027504 A1 | 3/2002 | Davis et al. | |
| 2004/0002792 A1 | 1/2004 | Hoffknecht | |
| 2004/0117330 A1* | 6/2004 | Ehlers et al. | 705/412 |
| 2004/0139038 A1* | 7/2004 | Ehlers et al. | 705/412 |
| 2007/0131787 A1 | 6/2007 | Rossi et al. | |
| 2007/0203860 A1 | 8/2007 | Golden et al. | 705/412 |
| 2008/0252141 A1* | 10/2008 | Horst | 307/35 |
| 2009/0001180 A1 | 1/2009 | Siddaramanna et al. | |

(Continued)

FOREIGN PATENT DOCUMENTS

| | | |
|---|---|---|
| CN | 1656661 | 8/2005 |
| CN | 101765758 | 6/2010 |
| CN | 101842800 | 9/2010 |
| CN | 202013526 | 10/2011 |

OTHER PUBLICATIONS

"Comverge IntelliTemp 900™", www.comverge.com, Apr. 2011, 2 pgs.

(Continued)

*Primary Examiner* — Mohammad Ali
*Assistant Examiner* — Anthony Whittington
(74) *Attorney, Agent, or Firm* — Harness, Dickey & Pierce, P.L.C.

(57) ABSTRACT

A controller in communication with one or more energy consuming appliances for a premises includes a transmitter device for transmitting wireless signals to a utility meter to request an energy consumption reading, and a receiver device to receive wireless signals including energy consumption information. The controller is configured to receive a signal from an energy consuming appliance indicating the appliance was actuated, and to responsively transmit a signal to the utility meter to request an energy consumption reading and thereafter receive a signal including an energy consumption value. Following deactivation of the appliance, the controller is configured to transmit a signal to the utility meter to request an energy consumption reading, and thereafter receive a signal from the meter including another energy consumption value. The controller is configured to determine from a difference between the energy consumption values an estimate of the energy consumption level associated with the appliance.

28 Claims, 4 Drawing Sheets

(56) References Cited

U.S. PATENT DOCUMENTS

| | | | |
|---|---|---|---|
| 2009/0024545 A1* | 1/2009 | Golden et al. | 705/412 |
| 2009/0096605 A1 | 4/2009 | Petite et al. | 340/539.22 |
| 2009/0099699 A1* | 4/2009 | Steinberg et al. | 700/278 |
| 2009/0157529 A1* | 6/2009 | Ehlers et al. | 705/26 |
| 2009/0228388 A1 | 9/2009 | Axelrod et al. | 705/37 |
| 2009/0312968 A1 | 12/2009 | Phillips | 702/62 |
| 2010/0070089 A1 | 3/2010 | Harrod et al. | |
| 2010/0070101 A1* | 3/2010 | Benes et al. | 700/296 |
| 2010/0070103 A1 | 3/2010 | Fleck et al. | 700/296 |
| 2010/0094470 A1* | 4/2010 | Besore et al. | 700/282 |
| 2010/0188262 A1 | 7/2010 | Reymann et al. | |
| 2011/0166710 A1 | 7/2011 | Kordik et al. | |
| 2011/0299547 A1 | 12/2011 | Diab et al. | |

OTHER PUBLICATIONS

Chinese Office action issued in Chinese Patent of Invention Application No. 201210008445.5 dated Dec. 12, 2013 (with translation) which claims priority to the instant application; 16 pgs.

USPTO Non-final Office action issued in U.S. Appl. No. 13/370,095 dated Feb. 10, 2014, which is a continuation-in-part of the instant application; 13 pgs.

Texas Instruments, Texas Instruments Advanced Scientific TI-81 Graphics Calculator Guidebook, 1990, front covers, inside fron cover, pp. i-vi, pp. 3-9 to 3-11 and back cover as supplied by the US Patent Office.

\* cited by examiner

APPARATUS AND METHOD FOR DETERMINING LOAD OF ENERGY CONSUMING APPLIANCES WITHIN A PREMISES

FIELD

The present disclosure relates to thermostats for controlling a heat-pump or air-conditioning unit, more specifically to thermostats that can provide demand side management to an electric utility provider.

BACKGROUND

This section provides background information related to the present disclosure which is not necessarily prior art.

As the demand for electrical power increases during the day, the utility provider experiences an increase in the cost of generating electrical power as a result of secondary peak power plants that are switched on to supplement off-peak power generating plants. Many utility providers are consequently establishing demand response programs to reduce energy demand as an alternative to building more plants. In situations where the peak demand begins to exceed the capacity of the utility's peak and off-peak power plants, the utility may engage in demand side management by curtailing operation of air-conditioning units to reduce demand for electrical power during peak demand periods, in an effort to keep energy demand from exceeding capacity. Utilities engaging in demand side management transmit a signal to a thermostat to control an air-conditioning unit to reduce the amount of energy used in peak demand periods. However, the utility company has little idea about how much load it is reducing by setting back a temperature setting or shutting off random air-conditioning units, and may not succeed in curbing energy consumption.

SUMMARY

This section provides a general summary of the disclosure, and is not a comprehensive disclosure of its full scope or all of its features.

Various embodiments of an apparatus or controller for determining the energy consumption level or load of an energy consuming appliance are provided. The various controllers are in communication with one or more energy consuming loads or appliances for a premises, such as an HVAC unit including heat-pump or air-conditioning components, an electric water heater, a refrigerator or pool pump. The exemplary controllers include a processor that is configured to receive energy consumption information from a utility meter for the premises prior to activation of the compressor and subsequent to activation of the compressor. The processor is further configured to estimate the energy consumption of the HVAC unit based at least in part upon the difference between the energy consumption prior to activation and subsequent to activation of the compressor.

According to another aspect of the present disclosure, a thermostat for monitoring the energy consumption associated with an HVAC unit having an electrically powered compressor is provided. The thermostat comprises a sensor that provides an output indicative of a temperature within a space of a premises, and a processor for controlling activation of at least the compressor of the HVAC unit to control the temperature in the space relative to a desired set-point temperature. The processor is configured to receive energy consumption information from a utility meter for the premises prior to activation of the compressor and subsequent to activation of the compressor, and further configured to estimate the energy consumption of the HVAC unit based at least in part upon the difference between the energy consumption prior to activation and subsequent to activation of the compressor. The thermostat further includes a display that displays an indication of the energy consumption for the HVAC system based at least in part upon the estimate. Accordingly, the thermostat may display energy consumption of an HVAC unit, or any other appliance in communication with the thermostat or gateway.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

In the various embodiments of the present disclosure, a controller is provided for determining an estimate of the energy consumption associated with one or more energy consuming loads or appliances for a premises, which provides value in understanding how the consumer's behavior impacts their energy consumption. With an estimate of the energy consumption, the consumer can make a more informed decision (e.g., turning off heating during sleep). In one aspect of the present disclosure, the various embodiments of a controller are in communication with one or more energy consuming loads or appliances for a premises, such as a heat-pump or air-conditioning unit, an electric water heater, a refrigerator or pool pump. The exemplary controllers include a processor that is configured to receive energy consumption information from a utility meter for the premises prior to activation of the compressor and subsequent to activation of the compressor. The processor is further configured to estimate the energy consumption of the HVAC unit is based at least in part upon the difference between the energy consumption prior to activation and subsequent to activation of the compressor.

Figure 1:
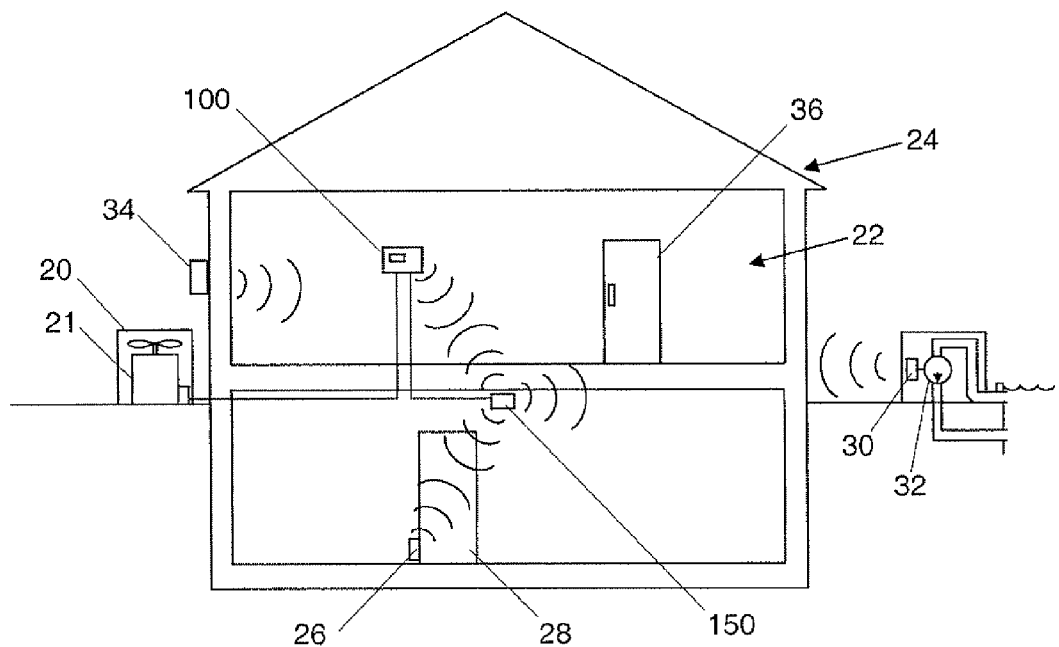
FIG. 1 is an illustration of a premises including one or more controllers configured to determine an estimate of the energy consumption level associated with one or more energy consuming appliances for a premises.

In one embodiment of the present disclosure, a thermostat for determining the energy consumption level of a heat-pump or air-conditioning unit is shown generally at 100 in FIG. 1. The thermostat 100 is connected to (or in communication with) a heat-pump or air-conditioning unit 20 (also referred to as HVAC unit) for heating or cooling a space 22 in a premises 24, and may be in communication with other system controllers, such as a controller 26 for an electric water heater 28, or a pump controller 30 for a pool water pump 32.

Figure 2:
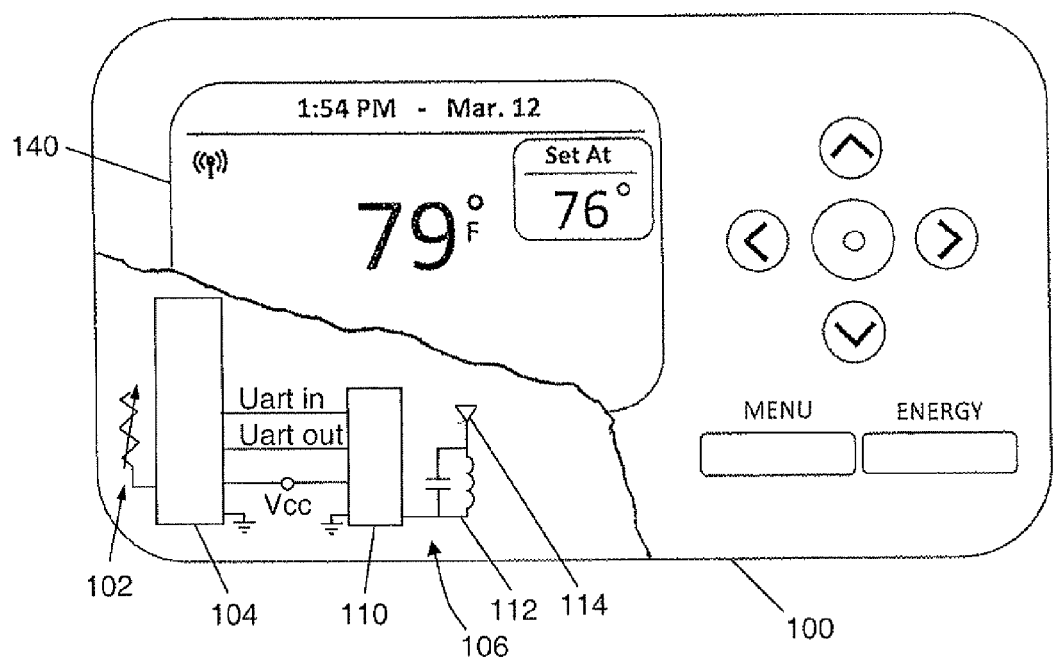
FIG. 2 is a schematic illustration of one embodiment of a thermostat configured to determine an estimate of the energy consumption level associated with a heat-pump or air-conditioning unit, in accordance with the present disclosure.

Referring to FIG. 2, the thermostat 100 includes a sensor 102 that is capable of sensing a temperature in the space 22, for use in controlling the operation of the heat-pump or air-conditioning unit 20 (or HVAC unit) to condition the space. The thermostat 100 further includes a processor 104 in communication with the sensor 102 for controlling activation and deactivation of at least a compressor 21 of the heat-pump or air-conditioning unit 20 (as shown in FIG. 1), for controlling the temperature within the space relative to a desired set-point temperature. Accordingly, the thermostat 100 includes at least one sensor 102 or temperature responsive device, which periodically outputs a value indicative of the temperature in the space 22. The sensor 102 may be any of a number of sensor types, and may comprise a crystal, oscillator or other electronic device with a reactance or frequency that changes in response to temperature. Alternatively, the sensor 102 may comprise a thermistor having a resistance value that changes in response to changes in temperature. The sensor 102 could also be a device capable of communicating a voltage value that correlates to, or is indicative of, the temperature sensed in the space 22. The sensor 102 may include circuitry to permit the sensor to communicate a value indicative of the temperature that is accurate to a tenth of degree Fahrenheit. Likewise, the sensor 102 may also include circuitry to enable communication of temperature information on a periodic basis or upon request, such as when prompted by a processor 104 of the thermostat 100. Accordingly, the sensor 102 is configured to sense and communicate information that is indicative of a temperature to a processor 104 having a program and a set point temperature, where the processor 104 is configured to control operation of the heat-pump or air-conditioning unit to adjust the sensed temperature in the space 22 to maintain the set-point temperature.

As shown in FIG. 1, the premises 24 in which the thermostat 100 is disposed preferably includes a utility meter 34 with Advanced Metering Infrastructure (AMI), which can transmit wireless signals that include energy consumption information. It should be noted that energy consumption information may comprise either the rate of power usage (expressed in kilowatts for example), or the amount of energy or power used (expressed as kilowatt-hours, for example) as explained below.

To operate, a compressor of an HVAC system requires electrical energy, which is usually measured and expressed in watt-hours. A watt is an electrical unit of power that is the rate of energy transfer. Thus, the rate of energy transfer to the compressor, or the rate of energy used while operating the compressor, is the power to the compressor that may be expressed in units of kilowatts. A watt-hour is an electric energy unit of measure equal to 1 watt of power supplied to, or used by, a load steadily for 1 hour. Thus, the energy consumption of a compressor over a period of time may be expressed in units of kilowatt-hours. The cumulative energy consumption, expressed in units of kilowatt-hours, may be determined from the product of the rate of energy usage expressed in kilowatts (e.g., power), and the duration of time that the compressor operated (e.g., hours), to arrive at a kilowatt-hour amount of energy consumed by a compressor over a period of time. Accordingly, as used herein, energy consumption information may comprise power (expressed in kilowatts) as well as power consumed over a time period (expressed in kilowatt-hours).

The energy consumption information communicated by an electric utility meter 34 may be provided or expressed in one or more forms. For example, the energy consumption reading may be a cumulative running total of the kilowatt-hours consumed for the premises. The difference between two such successive readings of kilowatt-hours used over a given time interval can be used to determine an amount of energy consumption (expressed as kilowatt-hours) for the time between the successive readings. The utility meter may also communicate energy consumption information that is representative of the present rate of energy usage (or power), expressed in kilowatts, where energy consumption expressed as kilowatt-hours may be determined from the product of the rate of energy usage (kilowatts) and the duration of time of operation (hours). Thus, the energy consumption of a compressor may be determined from the rate of energy usage expressed in kilowatts (e.g., power), and the duration of time that the compressor operated, to arrive at a kilowatt-hour amount of energy consumed by the compressor. With either form of energy consumption information provided by the utility meter (kilowatts or kilowatt-hours), it is possible to determine an estimate of the energy consumption for a period of operation of a compressor for a heat-pump/air-conditioning unit.

Referring back to FIG. 2, the thermostat 100 further includes a receiver device 106 configured to receive a signal transmitted by a utility meter 34 outside the premises 24 that utilizes an Advanced Metering Infrastructure (AMI) for transmitting/receiving signals that include energy consumption information. The receiver device 106 is in communication with the processor 104 of the thermostat 100. The thermostat 100 may include a receiver device 106 that further comprises a transmitter, which is configured to transmit wireless signals. The receiver device 106 and transmitter may be called a transceiver device 106. The transceiver device 106 is preferably connected to the processor 104 of the thermostat 100, where the transceiver device 106 and processor 104 are connected to a low voltage power supply Vcc. The transceiver device 106 may generally comprise a transceiver chip 110 that may also be connected to a resistor-capacitor filter circuit 112 and an antenna 114. The transceiver device 106 is configured to receive wireless signals transmitted by a utility meter 34 for the premises 24. The transceiver device 106 receives a signal from the utility meter via the antenna 114, and may compare the signal to a reference signal. For example, the signal may be compared to a local oscillator having a frequency of 418 miliHertz, and then demodulated into a digital data stream. This data may then be output via a Universal Asynchronous Serial transmission (UART) communication link, and is preferably decoded and transmitted as a serial bit stream signal from a data port pin of the transceiver chip 110 to an input port pin (such as a UART Port) on the processor 104. The processor 104 may be configured to load the signal data into a software buffer for protocol verification, and configured to strip the data and analyze a synchronization bit at the beginning of the signal to synchronize the signal and the utility meter 34 of the premises 24, for identifying the unique serial number within the transmission to verify signal protocol with a serial number for utility meter 34 of the premises 24. When protocol verification of a transmitted signal is complete and the signal for the utility meter 34 is verified, the processor 104 receives the signal data that includes energy consumption information.

The first embodiment of a thermostat 100 may be configured to periodically receive utility meter signals including energy consumption information in a continuous manner, without transmitting a signal to the utility meter to request such information. In this configuration, the thermostat 100 may periodically receive energy consumption information at regularly spaced time intervals. Accordingly, one embodiment of a thermostat 100 may include a sensor 102 and a processor 104 for controlling activation of at least a compressor of an HVAC unit to control the temperature in the space relative to a desired set-point temperature, where the processor 104 is configured to receive energy consumption information from a utility meter 34 for the premises prior to activation of the compressor and subsequent to activation of the compressor. The processor 104 of the thermostat 100 is further configured to estimate the energy consumption of the HVAC unit based at least in part upon the difference between the energy consumption prior to activation and subsequent to activation of the compressor. The thermostat 100 further includes a display 140 that displays an indication of the energy consumption associated with the operation of the HVAC system based at least in part upon the estimate. Where the energy consumption information received from the utility meter 34 is in terms of the rate of power usage (expressed in units of kilowatts), the difference between energy consumption prior to and subsequent to activation of the compressor is indicative of an increase in the rate of power usage by the HVAC unit, expressed in kilowatts. In the above embodiment, the thermostat 100 is configured to monitor the duration of time in which the compressor is activated, and energy consumption information received from the utility meter 34 expressed in units of kilowatts, such that an estimate of consumption of the HVAC unit may be determined from the increase in the rate of power usage (kilowatts) and the time the HVAC unit was activated. Thus, the thermostat 100 is configured to receive via wireless signals from the utility meter 34 information that is indicative of consumption before and after deactivation of the compressor, which is used to estimate consumption of the HVAC unit based at least in part upon the difference between the energy consumption prior to and subsequent to deactivation of the compressor.

In another configuration in which the utility meter 34 does not continuously transmit signals including energy consumption information, the thermostat 100 above includes a processor 104 that is configured to communicate via the transceiver device 106 (or receiver device and transmitter device) to the utility meter 34 to request energy consumption information prior to activation of the compressor, and to receive (via the receiver device 106) a first energy consumption value from the utility meter that is indicative of the energy consumption for the premises prior to activation of the compressor. After activation of the compressor, the processor 104 is configured to communicate via the transceiver device 106 (or receiver device and transmitter device) to the utility meter 34 to request energy consumption information after activation of the compressor, and to receive (via the receiver device 106) a second energy consumption value from the utility meter that is indicative of the energy consumption for the premises after activation of the compressor. Accordingly, the first energy consumption value and the second energy consumption value may each be readings of the rate of energy usage (e.g., kilowatts) for the premises, such that the difference between the first energy consumption value and the second energy consumption value is indicative of an increase in the rate of power usage (expressed in kilowatts) being used at the premises as a result of activation of the compressor of the HVAC unit. The energy consumption of the HVAC unit may be estimated or determined based on the increase in the rate of usage expressed in kilowatts (e.g., power), and the duration of time the compressor/HVAC unit was activated, to arrive at a kilowatt-hour amount of energy consumed by the HVAC unit.

The thermostat 100 of the first embodiment may be further configured to determine a second estimate of the energy consumption associated with the heat-pump or air-conditioning unit 20. After deactivation of the heat-pump or air-conditioning unit 20, the processor 104 of the thermostat 100 may be configured to communicate via the transmitter device to the utility meter 34 to request energy consumption information, and to receive via the receiver device a third energy consumption value. The processor 104 is further configured to determine, from a difference between the second energy consumption value and the third energy consumption value, a second estimate of the energy consumption for the HVAC unit. In the determination of the second estimate, the difference between the second energy consumption value and the third energy consumption value is indicative of a decrease in the rate of power usage expressed in kilowatts as a result of the deactivation of the compressor of and/or HVAC unit. This decrease provides the second estimate of the information on the energy consumption associated with the HVAC unit. The determination of the energy consumption for the HVAC unit could then be determined based in part on the decrease in the rate of power usage expressed in kilowatts, and the time duration that the HVAC unit was activated. Alternatively, where the energy consumption information received from the utility meter is expressed in units of kilowatt hours, the difference between the third energy consumption value and either the first or second energy consumption value would be indicative of the energy consumption of the HVAC unit (expressed in units of kilowatt-hours) for the time that the HVAC unit was activated.

Figure 3:
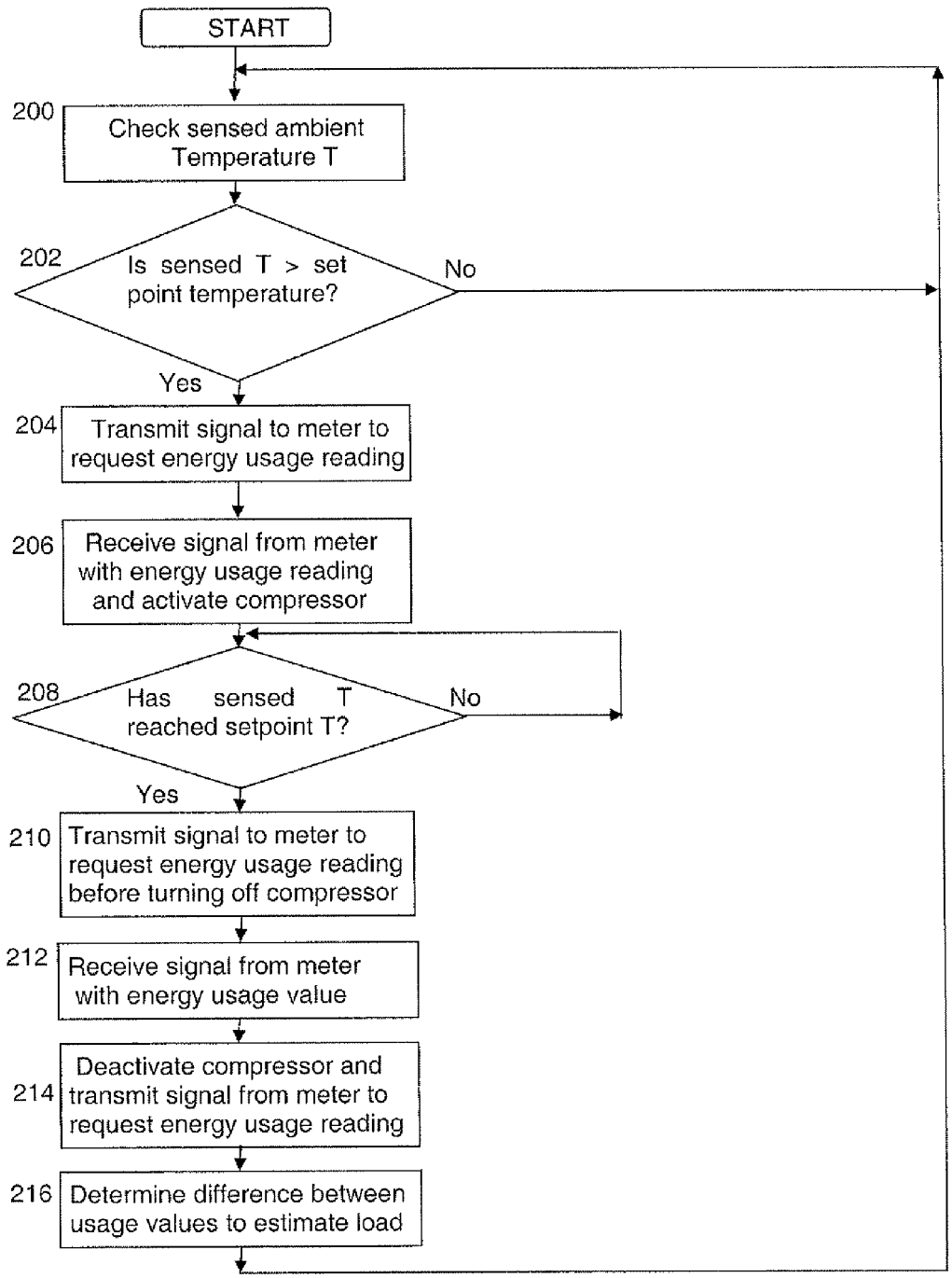
FIG. 3 shows a flow chart illustrating the operation of the thermostat embodiment in FIG. 1, in accordance with the present disclosure.

Referring to FIG. 3, a flow chart is shown illustrating the operational control of the processor 104 in a cooling mode for the thermostat 100 in FIG. 2. The processor 104 is configured to check the sensed temperature at step 200, to determine if it is above a set-point at step 202, and to then transmit signals at step 204 via the transceiver device 106 to the utility meter 34 for the premises 24, to request energy consumption information. Prior to activation of the compressor 21 (e.g., within a predetermined time before activation) at step 206, the processor 104 is configured to transmit a signal to the utility meter 34 to request an energy consumption reading, and to receive a signal from the utility meter 34 including a first energy consumption value. During operation of the compressor 21, the processor 104 is configured to determine when the sensed temperature has reached the set-point temperature at step 208. When the set-point is reached but before deactivation of the compressor 21, the processor 104 is configured to transmit a signal at step 210 to the utility meter 34 to request an energy consumption reading, and to receive a signal at step 212 from the utility meter 34 including a second energy consumption reading. After deactivation of the compressor 21 at step 214, the processor 104 is configured to determine, from a difference between the first energy consumption value and second energy consumption value, a first estimate of the energy consumption associated with the heat-pump or air-conditioning unit 20 at step 216. The processor 104 is thereby able to determine a load profile for the heat-pump or air-conditioning unit 20. The thermostat 100 may further include a display device 140 shown in FIG. 2 that is configured to display an indication of the energy consumption for the heat-pump or air-conditioning unit 20, as well as other information such as the sensed temperature within the premises 24.

Referring to FIG. 1, the first embodiment of a thermostat 100 for determining energy consumption level of an energy consuming load may further be connected to a gateway 150 for enabling connection via the Internet to a website. In this alternate embodiment of a system including a thermostat 100 and a gateway 150 for enabling connection via the internet to a website, the thermostat 100 is configured to communicate the information on the energy consumption associated with the heat-pump or air-conditioning unit 20 to the gateway 150. Communication of energy consumption information for the heat-pump or air-conditioning unit 20 through the gateway would permit an energy service provider to access the information on the energy consumption associated with the heat-pump or air-conditioning unit 20. This would enable energy service providers, seeking to shed load during peak demand periods by turning off air-conditioning units, to evaluate which premises air-conditioning units use the most energy and would provide the most reduction in load.

Furthermore, many energy service provider entities would like to have access to disaggregated load information within residences and buildings. Utility companies and energy service providers are willing to invest significantly to implement demand response and energy efficiency programs. Disaggregated load information would enable them to greatly enhance efficacy of both types of programs.

Air-conditioning systems account for up to 75 percent of peak load. As such, understanding each home's air-conditioning load and thermal profile would offer utility companies and energy service providers tremendous value in optimizing how they mitigate peak demand. For example, a utility company may have 200,000 homes participating in demand response programs that allow a broadband signal to be sent to smart thermostats, which sets back the set-point temperature by 4 degrees Fahrenheit, or cycles on and off during peak demand periods. But the energy service provider has little idea about the specific load profile or efficiencies of each home. As such, the demand response programs are designed less than optimally, since a 4 degrees Fahrenheit set-back of a thermostat in a home with an inefficient compressor or poor insulation would shed far less load than one that has excellent insulation.

The thermostat 100 provides for polling the utility meter for the aggregate load of the premises directly before the appliance to be measured turns on to establish a data point A. The thermostat 100 further polls the utility meter after the appliance is operating at its run rate or level of energy consumption, to establish data point B. Once the appliance turns off, the thermostat would poll the utility meter to establish data point C. The software associated with the processor 104 would then determine a difference between the energy consumption levels for data points A, B, and data points B and C, to calculate the load profile of the appliance, such as a heat-pump or air-conditioning unit. The processor may further be configured to average the differences over an extended period of time, such as 30 days for example, to ascertain an accurate load profile for the appliance. By keeping an ongoing record of the heat-pump or air-conditioning unit's energy consumption or performance, the thermostat could inform the consumer when the residence or building is experiencing efficiency degradation, possibly due to low refrigerant charge or an antiquated compressor. For example, the ongoing data record could be used to detect degradation of the appliance's performance by comparison to historical data for the previous summer for determining a difference in consumption. It should be noted that this data record monitoring can be performed remotely, where the thermostat communicates data to a server at a remote location for processing. The thermostat could display the difference that the performance degradation will cost the user as an extra amount, or indicate how much the user could save by upgrading to a new system.

Understanding which homes have inefficient or high energy consumption air-conditioning units would enable energy service providers to have much more accuracy in determining the optimum operation of their demand response programs, by targeting homes with the highest energy consumption air-conditioning units. Accordingly, one embodiment of a thermostat 100 is configured to receive via the gateway 150 a signal from an energy service provider requesting curtailment of operation of the heat-pump or air-conditioning unit 20, based on the information on the energy consumption associated with the heat-pump or air-conditioning unit 20. Additionally, energy efficiency implementation firms, such as White-Rodgers Division of Emerson Electric Co., may also use this information to target homes that are most in need of equipment upgrades or service. The utility company could be provided with an incentive to pay for efficiency upgrade programs for such homes that are in need of equipment upgrades.

Figure 4:
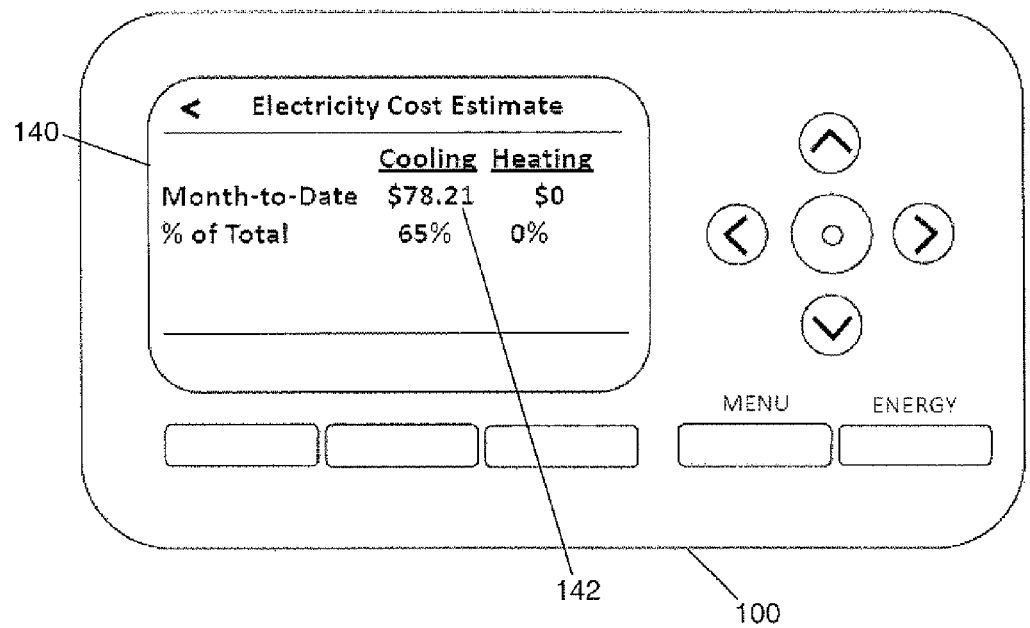
FIG. 4 shows one embodiment of a thermostat displaying a cost estimate for energy consumed by an appliance.

In another aspect of the present disclosure, the thermostat 100 of the first embodiment is configured to determine a sum of the energy consumption by the heat-pump or air-conditioning unit 20 within a predetermined period of time, such as the current week or a given month, and to display on the display device 140 an indication of the sum of the energy consumption by the heat-pump or air-conditioning unit 20 for the given month, as shown in FIG. 4. The thermostat 100 may further be configured to display on the display device 140 an indication of a cost estimate 142 associated with the sum of the energy consumed by the heat-pump or air-conditioning unit 20 within the given month.

According to another aspect of the present disclosure, a second embodiment of a system for determining an estimate of the load of an energy consuming device is provided. The system includes a thermostat 100 and a gateway 150 for determining energy consumption for energy consuming loads in a premises 24, as shown in FIG. 1. The system includes a thermostat 100 having a sensor 102 that is preferably within the thermostat 100, which provides an output indicative of the sensed temperature of the space. The thermostat 100 further includes a processor 104 that is in communication with the sensor 102, for controlling activation of at least a compressor 21 of a heat-pump or air-conditioning unit 20, as shown in FIGS. 1-2.

In the second embodiment, the system further includes a gateway 150, or an Energy Service Interface (ESI), which is in connection with the thermostat 100. The gateway 150 is configured to enable connection via the internet to a website. The gateway 150 further includes a transmitter device for transmitting wireless signals to a utility meter 34 for the premises to request energy consumption information, and a receiver device for receiving wireless signals including energy consumption information from the utility meter 34. It should be noted that the transmitter device and receiver device may comprise a transceiver device 106 such as that described above and in FIG. 2.

The processor 104 of the thermostat 100 is configured to control activation of at least a compressor 21 of a heat-pump or air-conditioning unit 20 for controlling temperature within a space relative to a set-point, and further configured to signal the gateway 150 before the thermostat 100 activates the compressor 21. Alternatively, the gateway 150 may be the control that activates the compressor 21. The gateway 150 is configured to receive from the thermostat 100 information indicating that the compressor 21 will be activated, and responsively transmit a signal to the utility meter 34 to request energy consumption information. The gateway 150 thereafter receives a signal including a first energy consumption value that is indicative of energy consumption for the premises while the compressor 21 is "off." Alternatively, the gateway 150 may obtain the "off" first energy consumption value after deactivation of the compressor 21. The gateway 150 is configured to transmit a signal to the utility meter 34 after activation of the compressor to request energy consumption information, and to thereafter receive a signal including a second energy consumption value. The gateway 150 is further configured to determine, from a difference between the first energy consumption value and second energy consumption value, a first estimate of the energy consumption associated with the heat-pump or air-conditioning unit 20. The gateway 150, or the thermostat 100, may be configured to monitor the duration of time in which the compressor is activated.

As in the first embodiment, the energy consumption information from the utility meter 34 may be provided in one or more forms. For example, the energy consumption reading may be a cumulative running total of the kilowatt-hours consumed for the premises, where the difference between two such successive readings over a given time interval can be used for determining the kilowatt-hours consumed within the time interval, to thereby obtain a level of energy consumption during the time interval. The utility meter may also communicate an energy consumption reading that is the rate of energy used, expressed in units of kilowatts. Accordingly, the gateway 150 may determine a difference between the first energy consumption value and the second energy consumption value, which is indicative of an increase in the rate of power usage expressed in kilowatts. The gateway 150 is configured to estimate the energy consumption of the HVAC unit, based on the increase in the rate of power usage and the time duration that the HVAC unit was activated.

After deactivation of the compressor 21 of the heat-pump or air-conditioning unit 20, the gateway 150 is configured to transmit a signal to the utility meter 34 to request energy consumption information, and to receive a signal from the utility meter 34 including a third energy consumption value. The gateway 150 is further configured to determine, from a difference between the second energy consumption value and the third energy consumption value, a second estimate of the energy consumption associated with the heat-pump or air-conditioning unit 20. The difference between the second energy consumption value and the third energy consumption value is a decrease in energy consumption, as a result of the deactivation of the compressor/heat-pump or air-conditioning unit 20. The gateway 150 is configured to estimate energy consumption of the HVAC unit based on the decrease in the rate of power usage, and the time duration that the HVAC unit was activated.

In the second embodiment of a system for monitoring an energy consuming appliance, the gateway 150 is configured to communicate the information on the energy consumption to the thermostat 100. The thermostat 100 includes a display device 140 configured to display an indication of the energy consumption associated with the compressor and/or heat-pump or air-conditioning unit 20 to a user of the thermostat 100. The gateway 150 is further configured to communicate the information on the energy consumption associated with the compressor and/or heat-pump or air-conditioning unit 20 via the internet to an energy service provider, to provide the energy provider with information on the energy consumption associated with the heat-pump or air-conditioning unit 20. This would enable energy service providers, seeking to shed load during peak demand periods by turning off air-conditioner systems, to evaluate which premises air-conditioning units use the most energy and would provide the most reduction in load. This information could then be utilized by the energy service provider in sending a signal to the premises 24 using the most energy to request curtailment of the heat-pump or air-conditioning unit 20 for the premises 24. To enable such curtailment, the thermostat 100 is configured to receive a signal via the gateway 150 from the energy service provider requesting curtailment of operation of the heat-pump or air-conditioning unit 20. The signal from the energy service provider would be based on the information on the energy consumption level or load associated with the particular heat-pump or air-conditioning unit 20. Additionally, the gateway 150 may be configured to determine a sum of the energy consumption by the heat-pump or air-conditioning unit 20 (and any appliance that can be controllably turned on and off) within a predetermined time period, such as the current week or month, and to communicate the sum of the energy consumption by the heat-pump or air-conditioning unit 20 for the given month to the thermostat 100 for display on the display device 140 of the thermostat 100. Alternatively, the thermostat 100 may be configured to determine a sum of the energy consumption by the heat-pump or air-conditioning unit 20 within a given time period, and to display on the display device 140 of the thermostat 100 an indication of the energy consumption for the given time period. The thermostat 100 may further be configured to display on the display device 140 an indication of cost estimate 142 associated with the sum of the energy consumed by the heat-pump or air-conditioning unit 20 within the given time period, as shown in FIG. 4.

The above embodiments of a thermostat enable the consumer to be given real time feedback on the costs of their energy consumption associated with the heat-pump or air-conditioning unit, and will enable them to make smarter decisions about how and when they use electricity and reducing energy consumption. This is important because people rarely cut back on consumption until they understand the impact on them as a result of specific behaviors, and real time disaggregated load information for appliance energy consumption level can enhance conservation, encourage the use of programming features on the thermostat as well as encourage equipment upgrades for inefficient appliances. Not only can the thermostat enable the consumer to understand how much electrical power the heat-pump or air-conditioning unit is consuming, it can provide them with value added information on ways to save.

Accordingly, one embodiment of a thermostat for monitoring the energy consumption associated with an HVAC unit is provided that includes a sensor for sensing temperature and a processor for controlling activation of a compressor of an HVAC unit to control the temperature in the space relative to a desired set-point temperature. The processor is configured to receive energy consumption information from a utility meter for the premises prior to activation of the compressor and subsequent to activation of the compressor, and further configured to estimate the energy consumption of the HVAC unit based at least in part upon the difference between the energy consumption prior to activation and the energy consumption subsequent to activation of the compressor. The thermostat includes a display that displays an indication of the energy consumption of the HVAC system based at least in part upon the estimate, wherein the processor of the thermostat is configured to control the display to display a graph indicating an estimated cost of the energy consumed by the heat-pump or air-conditioning unit for each day within a given month.

Figure 6:
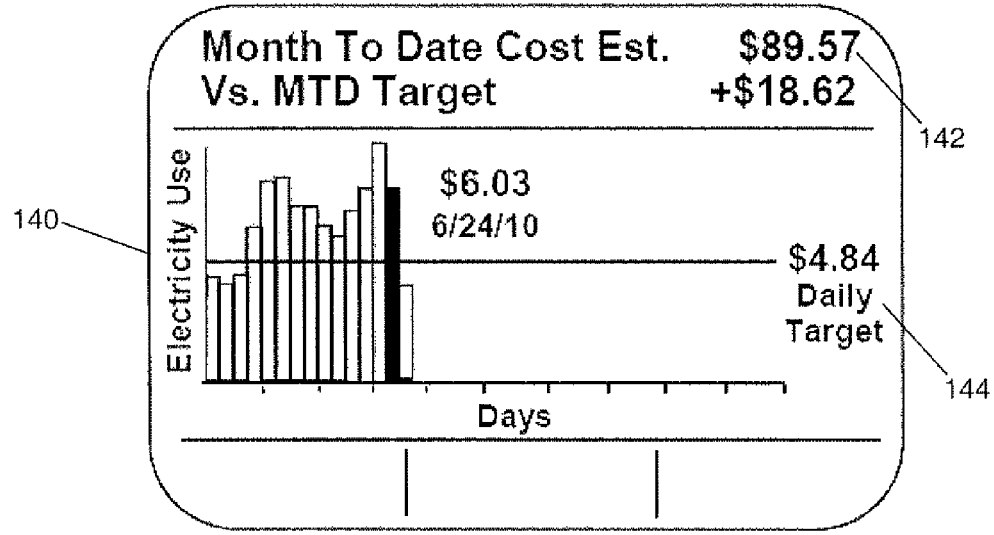
FIGS. 6-7 shows the thermostat in FIG. 4 displaying selection of a given day within the graph of daily energy consumption for an appliance.
Figure 7:
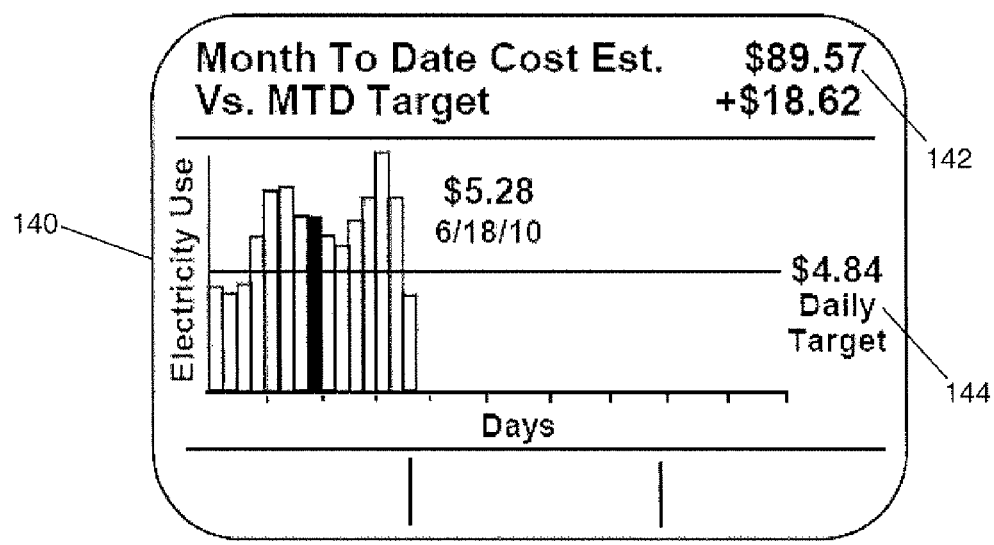

For example, the thermostat in the above embodiments could display a weekly cost estimate in real time to the user, and predict from the energy consumption load profile the air-conditioning costs to the homeowner to help them with their budgeting. The processor 104 of the thermostat 100 shown in FIG. 2 is configured to determine, from the last energy consumption reading received from the utility meter 34 each day, a difference between such daily readings that indicates the aggregate energy consumption for each day. Using a price rate for the energy consumption, the processor 104 of the thermostat 100 in FIG. 2 is further configured to display on the display device 140 a graph showing the present day's energy consumption, as represented by the black highlighted bar shown in FIG. 5. The display device may further display a daily cost target 144, and a Month-to-date cost estimate 142 for the energy consumption for the premises 24. By multiplying the daily target by the number of days in the month to date, a difference between a Month-to-date target and the Month-to-date costs can be used to display an amount that the energy costs are above or below the month-to-date target. In response to a selection by the user, the display device 140 can display the previous day's energy consumption, as represented by the black highlighted bar shown in FIG. 6. Similarly, the user can select any day of the current Month to see how much the daily cost of energy consumption was, as shown by the black highlighted bar shown in FIG. 7.

Figure 5:
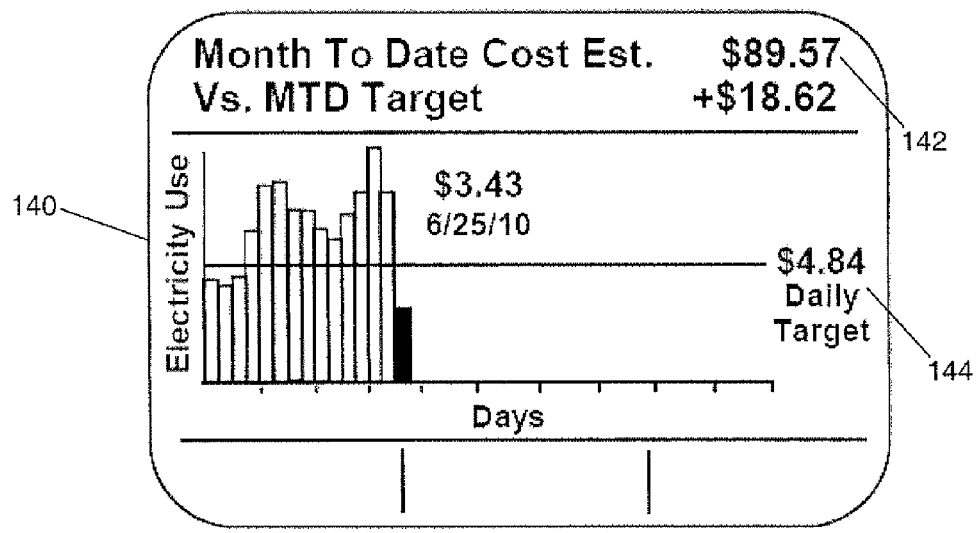
FIG. 5 shows the thermostat in FIG. 4 displaying a graph of daily energy consumption for an appliance.

The thermostats in the above embodiments can be configured to display the energy consumption data described above, to enable the consumer to set a monthly energy consumption cost target. The thermostat can be configured to prompt the consumer to enter a value for their monthly energy target cost, and the day their billing cycle starts so they can track consumption in alignment with their actual billing cycle. For example, the user could enter a start date of the 12$^{th}$ and a $150 target cost for the Month, which would be divided by 30 days to obtain a daily target cost of $5 per day. The display would then graph the daily energy consumption on a bar chart showing whether the consumer's energy consumption for each day was above or below their daily target cost, along with a Month-to-date total at the top of the display device 140. The display device 140 can also display an amount that the energy costs are above or below the month-to-date target, to let the consumer know if they are on track to go over or under target. If they are above their target as shown in FIG. 5, the consumer will know they have to cut back on the remaining days of the Month in order to hit their target Monthly energy consumption costs.

The thermostat 100 may be configured to collect historical data for the summer to determine an estimated energy cost that could have been saved if the user had set back the temperature setting by an additional 1 degree for the entire summer, and to responsively instruct the display device 140 to display the estimated cost. The thermostat 100 may be further be configured to compare the appliance's monthly energy consumption to historical data for the previous summer to determine a prediction of a difference in consumption, and responsively instruct the display device 140 to display a message indicating that if the current summer is like the last summer, an additional 1 degree set back of temperature setting could yield an estimated monthly savings of a determined amount. The thermostat 100 may be configured to provide an easily accessible display of a graph that concisely shows on one display the relevant energy consumption information, without requiring the user to look at several charts or scroll through menus. The displayed target also enables the user to more effectively control their appliances (e.g., thermostat set-point temperature) keep their energy consumption costs under budget, as opposed to merely showing real time energy consumption data.

According to another aspect of the present disclosure, a third embodiment of a system for monitoring an energy consuming load in a premises is provided. The system includes a gateway 150, or an ESI device, for enabling connection via the internet to a website, where the gateway 150 is in communication with a plurality of energy consuming appliances or loads including one or more of a thermostat 100, an electric water heater 28, a refrigerator 36, a pool water pump 32, media center, etc.

In the third embodiment of a system for monitoring an energy consuming load in a premises, the gateway 150 is in communication with a plurality of switch controls for a plurality of energy consuming loads in the premises, including one or more devices such as a thermostat 100, an electric water heater 28, and a refrigerator 36 of a premises. The gateway is configured to receive a signal from one of the thermostat 100, the electric water heater 28 and the refrigerator 36 indicating that the energy consuming load is activated, and configured to receive energy consumption information from a utility meter for the premises when the energy consuming load is operating and when the energy consuming load is not operating. The gateway 150 is further configured to estimate the energy consumption of the energy consuming load unit based at least in part upon the difference between the energy consumption during operation and the energy consumption during non-operation of the energy consuming load, as explained below.

The gateway 150 may include, for example, a transmitter device for transmitting wireless signals to a utility meter for the premises to request energy consumption information and a receiver device 106 for receiving wireless signals including energy consumption information from the utility meter 34. The gateway 150 may receive a signal from one of the thermostat 100, the electric water heater 28, the refrigerator 36 or a pool water pump 32 indicating that the energy consuming load is operating. The electric water heater 28, refrigerator 36 or pool water pump 32 may be connected to a smart outlet or a high amp load control switch device, which is configured to control any appliance plugged into it and to communicate with the gateway 150.

Accordingly, the gateway is configured to receive a signal from one of the thermostat 100, the electric water heater 28 and the refrigerator 36 indicating that the energy consuming device is operating, and to responsively transmit a signal to the utility meter to request energy consumption information and to receive a signal from the utility meter including a first energy consumption value. The gateway is further configured to transmit a signal to the utility meter after deactivation of the energy consuming load, to request energy consumption information and thereafter receive a signal from the utility meter including a second energy consumption value. After receiving the energy consumption information, the gateway is further configured to determine, from a difference between the first and second energy consumption values, an estimate of the energy consumption associated with the energy consuming load.

For example, if the gateway 150 receives a signal from a controller 26 of an electric water heater 28 (or an associated smart outlet) that indicates the electric water heater 28 was activated and/or operating, the gateway 150 is configured to responsively transmit a signal to the utility meter 34 to request energy consumption information, and to receive a signal from the utility meter 34 including a first energy consumption value. Following deactivation of the energy consuming load, the gateway 150 is configured to transmit a signal to the utility meter 34 to request energy consumption information, and to receive a signal from the utility meter 34 including a second energy consumption value. The gateway 150 is further configured to determine, from a difference between the first and second energy consumption values, an estimate of the energy consumption associated with the activated energy consuming appliance. The gateway 150 may further be configured to monitor the activation of the appliance to detect a rapid frequency of activation/deactivation, or an elevated energy consumption level for the appliance, which may be indicative of a fault of the appliance. In response to detecting activation or energy consumption information indicative of a fault, the gateway 150 is configured to responsively turn off the appliance and notify an occupant or service provider of the fault.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A thermostat for monitoring the energy consumption associated with an HVAC unit having an electrically powered compressor, comprising:
   a sensor that provides an output indicative of a temperature within a space of a premises;
   a processor for controlling activation of at least the compressor of the HVAC unit to control the temperature in the space relative to a desired set-point temperature, the processor being configured to receive energy consumption load measurements from a utility meter for the premises prior to activation of the compressor and subsequent to activation of the compressor, and further configured to estimate the energy consumption of the HVAC unit based at least in part upon the difference between the energy consumption load measurement prior to activation and the energy consumption load measurement subsequent to activation of the compressor;
   a display that displays an indication of the energy consumption of the HVAC system based at least in part upon the estimate;
   a gateway for enabling connection via the internet to a website, wherein the thermostat is configured to communicate the information on the energy consumption associated with the HVAC unit to the gateway to permit an energy service provider to access the information on the energy consumption for the HVAC unit;
   wherein the thermostat is configured to monitor a duration of time in which the compressor is activated; and
   wherein the thermostat is configured to receive energy consumption information from a utility meter for the premises in terms of the rate of power usage expressed in units of kilowatts, such that the difference between energy consumption prior to and subsequent to activation of the compressor is indicative of an increase in the rate of power usage expressed in kilowatts, and the estimate of consumption is based on the increase in the rate of power usage and the time duration that the HVAC unit was activated.

2. A thermostat for monitoring the energy consumption associated with an HVAC unit having an electrically powered compressor, comprising:
   a sensor that provides an output indicative of a temperature within a space of a premises;
   a processor for controlling activation of at least the compressor of the HVAC unit to control the temperature in the space relative to a desired set-point temperature, the processor being configured to receive energy consumption load measurements from a utility meter for the premises prior to activation of the compressor and subsequent to activation of the compressor, and further configured to estimate the energy consumption of the HVAC unit based at least in part upon the difference between the energy consumption load measurement prior to activation and the energy consumption load measurement subsequent to activation of the compressor;
   a display that displays an indication of the energy consumption of the HVAC system based at least in part upon the estimate; and
   a transmitter device configured to transmit wireless signals and a receiver device configured to receive wireless signals, wherein the processor is configured to communicate via the transmitter device to the utility meter to request energy consumption information prior to activation of the compressor, and to receive via the receiver device a first energy consumption value from the utility meter that is indicative of energy consumption for the premises prior to activation of the compressor;
   wherein the thermostat is configured to monitor a duration of time in which the compressor is activated.

3. The thermostat of claim 2, wherein after activation of the compressor the processor is configured to communicate via the transmitter device to the utility meter to request energy consumption information and to receive via the receiver device a second energy consumption value indicative of energy consumption after activation of the compressor, the processor being configured to determine, from a difference between the first and second energy consumption values, a first estimate of the energy consumption of the HVAC unit.

4. The thermostat of claim 2, wherein the difference between the first energy consumption value and the second energy consumption value is indicative of an increase in the rate of power usage expressed in kilowatts, and the consumption of the HVAC unit is estimated based on the increase in the rate of power usage and the time duration that the HVAC unit was activated.

5. The thermostat of claim 2, wherein after deactivation of the HVAC unit, the processor is configured to communicate via the transmitter device to the utility meter to request energy consumption information and to receive via the receiver device a third energy consumption value, and the processor is configured to determine from a difference between the second energy consumption value and the third energy consumption value a second estimate of the energy consumption for the HVAC unit.

6. The thermostat of claim 5, wherein the difference between the second and third energy consumption values is a decrease that is indicative of the rate of power usage of the HVAC unit expressed in kilowatts, and the processor is configured to estimate energy consumption of the HVAC unit based on the decrease in the rate of power usage and the time duration that the HVAC unit was activated.

7. The thermostat of claim 5 wherein the thermostat is configured to obtain energy consumption information from an electric utility meter in terms of the power usage expressed in units of kilowatt-hours, and the processor is configured to estimate energy consumption of the HVAC unit based on the difference between the third energy consumption value and the first energy consumption value, expressed in units of kilowatt-hours, for the time duration that the HVAC unit was activated.

8. The thermostat of claim 2, wherein the thermostat is configured to receive consumption information from a utility meter supplying the HVAC unit.

9. The thermostat of claim 2, wherein the thermostat is configured to receive energy consumption information via wireless signals from the utility meter.

10. The thermostat of claim 2, wherein the thermostat is configured to receive energy consumption information from a utility meter for the premises in terms of the rate of power usage expressed in units of kilowatts, such that the difference between energy consumption prior to and subsequent to activation of the compressor is indicative of an increase in the rate of power usage expressed in kilowatts, and the estimate of consumption is based on the increase in the rate of power usage and the time duration that the HVAC unit was activated.

11. The thermostat of claim 2, where the processor is configured to obtain information about consumption after deactivation of the compressor of the HVAC unit and to estimate consumption of the HVAC unit based at least in part upon the difference between the energy consumption prior to and subsequent to deactivation of the compressor.

12. The thermostat of claim 11, wherein the thermostat is configured to receive via a gateway a signal from an energy service provider requesting curtailment of operation of the HVAC unit based on the information on the energy consumption for the HVAC unit.

13. The thermostat of claim 2, wherein the thermostat is configured to determine a sum of the energy consumption by the HVAC unit within a given time period.

14. The thermostat of claim 13, wherein the thermostat is configured to display on the display device an indication of the energy consumption for the given time period.

15. A system including a thermostat and a gateway for monitoring energy consumption associated with an HVAC unit having an electrically powered compressor, comprising: a sensor that provides an output indicative of the sensed temperature within a space of a premises; a processor of the thermostat that is in communication with the sensor for controlling activation of at least a compressor of an HVAC unit for controlling the temperature in the space relative to a desired set-point temperature; and a gateway in connection with the thermostat, for enabling connection via the internet to a website, the gateway including a transmitter for transmitting wireless signals to a utility meter for the premises to request energy consumption information and a receiver for receiving wireless signals including energy consumption information from the utility meter--wherein the gateway is configured to receive from the thermostat information indicating an upcoming activation of the compressor, and responsively transmit a signal to the utility meter to request energy consumption information and to receive a signal including a first energy consumption load measurement
wherein the gateway is configured to transmit a signal to the utility meter after activation of the compressor to request energy consumption information, and to receive a signal including a second energy consumption load measurement; the gateway being further configured to estimate the energy consumption of the HVAC unit based at least in part upon the difference between the first energy consumption load measurement and second energy consumption load measurement;
wherein the thermostat is configured to monitor a duration of time in which the compressor is activated; wherein the difference between the first energy consumption load measurement and the second energy consumption load measurement is indicative of an increase in the rate of power usage expressed in kilowatts, and the estimate of energy consumption of the HVAC unit is based on the increase in the rate of power usage and the time duration that the HVAC unit was activated;
wherein after deactivation of the compressor of the HVAC unit the gateway is configured to transmit a signal to the utility meter to request energy consumption information and to receive a signal from the utility meter including a third energy consumption load measurement, and the gateway is further configured to determine, from a difference between the second energy consumption load measurement and the third energy consumption load measurement, a second estimate of energy consumption of the HVAC unit; and wherein the difference between the second and third energy consumption load measurements is a decrease that is indicative of the rate of power usage of the HVAC unit expressed in kilowatts, and the gateway is configured to estimate energy consumption of the HVAC unit based on the decrease in the rate of power usage and the time duration that the HVAC unit was activated.

16. The system of claim 15 wherein the gateway is configured to communicate information indicative of the estimate of energy consumption of the HVAC unit via the internet to an energy service provider.

17. The system of claim 16, wherein the thermostat is configured to receive via the gateway a signal from an energy service provider requesting curtailment of operation of the HVAC unit based on the information on the energy consumption of the HVAC unit.

18. The system of claim 17, wherein the thermostat is configured to determine a sum of the energy consumption by the HVAC unit within a given time period and to display on the display device an indication of the energy consumption for the given time period.

19. The system of claim 15 wherein the thermostat further includes a display configured to display an indication of the energy consumption of the HVAC system based at least in part upon the estimate.

20. A system including the thermostat of claim 1, wherein the system permits the energy service provider to access disaggregate load information supplied by the thermostat via the gateway, which allows the energy service provider to determine which homes, residences, and/or buildings use the most electricity and would therefore provide the most reduction in load with curtailment of operation.

21. The thermostat of claim 1, wherein:
the thermostat is operable for providing real time feedback on costs of energy consumption associated with the HVAC unit; and/or
the thermostat is operable for providing real time disaggregated load information for appliance energy consumption level.

22. The thermostat of claim 1, wherein communication of the energy consumption information for the HVAC unit by the thermostat through the gateway permits the energy service provider access to disaggregated load information for the premises.

23. A system including the thermostat of claim 2 and a gateway, wherein the system permits an energy service provider to access disaggregate load information supplied by the thermostat via the gateway, which allows the energy service provider to determine which homes, residences, and/or buildings use the most electricity and would therefore provide the most reduction in load with curtailment of operation.

24. The thermostat of claim 2, wherein:
the thermostat is operable for providing real time feedback on costs of energy consumption associated with the HVAC unit; and/or
the thermostat is operable for providing real time disaggregated load information for appliance energy consumption level.

25. A system including the thermostat of claim 2 and a gateway, wherein communication of the energy consumption information for the HVAC unit by the thermostat through the gateway permits an energy service provider access to disaggregated load information for the premises.

26. The system of claim 15, wherein the system permits an energy service provider to access disaggregate load information supplied by the thermostat via the gateway, which allows the energy service provider to determine which homes, residences, and/or buildings use the most electricity and would therefore provide the most reduction in load with curtailment of operation.

27. The system of claim 15, wherein:
the thermostat is operable for providing real time feedback on costs of energy consumption associated with the HVAC unit; and/or
the thermostat is operable for providing real time disaggregated load information for appliance energy consumption level.

28. The system of claim 15, wherein communication of the energy consumption information for the HVAC unit by the thermostat through the gateway permits an energy service provider access to disaggregated load information for the premises.

* * * * *

UNITED STATES PATENT AND TRADEMARK OFFICE
CERTIFICATE OF CORRECTION

| | | |
|---|---|---|
| PATENT NO. | : 8,761,944 B2 | Page 1 of 1 |
| APPLICATION NO. | : 13/005306 | |
| DATED | : June 24, 2014 | |
| INVENTOR(S) | : Drew et al. | |

It is certified that error appears in the above-identified patent and that said Letters Patent is hereby corrected as shown below:

On the title page item (75), should read:

Inventor: David Scott Drew, St. Louis, MO (US)

Signed and Sealed this
Twenty-fifth Day of August, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,761,944 B2 | Page 1 of 1 |
| APPLICATION NO. | : 13/005306 | |
| DATED | : June 24, 2014 | |
| INVENTOR(S) | : Drew | |

It is certified that error appears in the above-identified patent and that said Letters Patent is hereby corrected as shown below:

On the title page item (75), should read:

Inventor: David Scott Drew, St. Louis, MO (US)

This certificate supersedes the Certificate of Correction issued August 25, 2015.

Signed and Sealed this
Twenty-fourth Day of November, 2015

Michelle K. Lee
*Director of the United States Patent and Trademark Office*